UNITED STATES PATENT OFFICE.

LEONHARD LEDERER, OF SULZBACH, GERMANY.

PROCESS OF SEPARATING CELLULOSE ESTERS FROM SOLUTIONS.

No. 902,093.     Specification of Letters Patent.     Patented Oct. 27, 1908.

Application filed November 24, 1906. Serial No. 344,867.

*To all whom it may concern:*

Be it known that I, LEONHARD LEDERER, a subject of the German Emperor, residing at Sulzbach, Germany, have invented a certain new and useful Process for Separating Cellulose Esters from Solutions, of which the following is a specification.

If cellulose is esterized by means of acid anhydrid or acid chlorid, the product of the reaction is usually not obtained in a solid form, but in the shape of solutions, from which the cellulose esters must be separated. For this purpose liquids, such as water and alcohol, which do not dissolve cellulose, may be used, or if it is desired to recover at the same time unaltered acid anhydrid or the acid which has been formed by the reaction or added as a diluent, benzene and similar compounds may be employed instead of water or alcohol. I have found, that for the latter purpose carbon tetra-chlorid is eminently suitable, because it will not dissolve any of the cellulose esters obtained by the methods of manufacture hitherto known, and is generally applicable for the separation of the same, besides being unimflammable, and because its boiling point is substantially different from that of the acid anhydrid and the acid arising during the reaction or added for dilution, which facilitates the separation of the mixture composed of these bodies.

The use of carbon tetra-chlorid renders it practicable, to effect the separation of the mass produced by the esterfication in open receptacles, and consequently to dispense with special apparatus.

In view of the fact, that substances similar to carbon-tetra-chlorid, such as chloroform, ethane tetra-chlorid and dichlorhydrin, are excellent solvents for cellulose esters, the above mentioned properties of carbon-tetrachlorid could not be foreseen, but had to be ascertained by experiment.

Example: The liquid to be treated may be, for instance, the product of the reaction produced by acetylizing cellulose with acetic anhydrid. Carbon-tetra-chlorid is added, while carefully stirring, until a thick uniform paste has been formed. The paste is pressed, and if necessary the solid residue is again stirred with tetra-chlorid and the mixture treated in the manner described.

What I claim is:—

1. The process for obtaining cellulose esters from solutions of the same, which consists in intimately intermingling carbontetrachlorid with the solution until a paste is formed, and then subjecting the product to mechanical separation, substantially as described.

2. The process for obtaining cellulose esters from liquid acidylizing mixtures, which consists in intimately intermingling carbon tetrachlorid with the mixture until a paste is formed, and then subjecting the product to mechanical separation, substantially as described.

In testimony whereof I have set my hand hereunto in the presence of two subscribing witnesses.

LEONHARD LEDERER.

Witnesses:
    KARL SHAEFER, Jr.,
    CARL SINGER.